United States Patent
Horwitz

[11] 3,968,912
[45] July 13, 1976

[54] BALL AND RACKET CARRIER
[76] Inventor: Norton Horwitz, 2647 Prindle, Arlington Heights, Ill. 60504
[22] Filed: Nov. 11, 1974
[21] Appl. No.: 522,493

[52] U.S. Cl. ............................ 224/36; 224/42.46 R
[51] Int. Cl.² ............................................ B62J 7/06
[58] Field of Search ................ 224/39 R, 41, 30 R, 224/30 A, 42.45 R, 29 R, 42.46 R, 42 R, 36, 32 R; 280/289, 202; 211/60 R, 13, 14; 206/315

[56] References Cited
UNITED STATES PATENTS
597,318    1/1898    Jenks ................................ 224/39 R
2,482,589  9/1949    Maguire ......................... 224/28 R X FOREIGN PATENTS OR APPLICATIONS
520,835    7/1921    France ............................. 224/30 R
223,688   12/1942    Switzerland ..................... 224/39 R Primary Examiner—Robert J. Spar
Assistant Examiner—Jerold M. Forsberg
Attorney, Agent, or Firm—Irving Faber

[57]    ABSTRACT
This invention relates to a new and useful device for carrying a tennis or a racquet ball racket and a can of balls. The device comprises a pair of rods shaped into a figure "8" and connected together by an "L" shaped rod and is attached to a bicycle.

3 Claims, 5 Drawing Figures

U.S. Patent  July 13, 1976  3,968,912
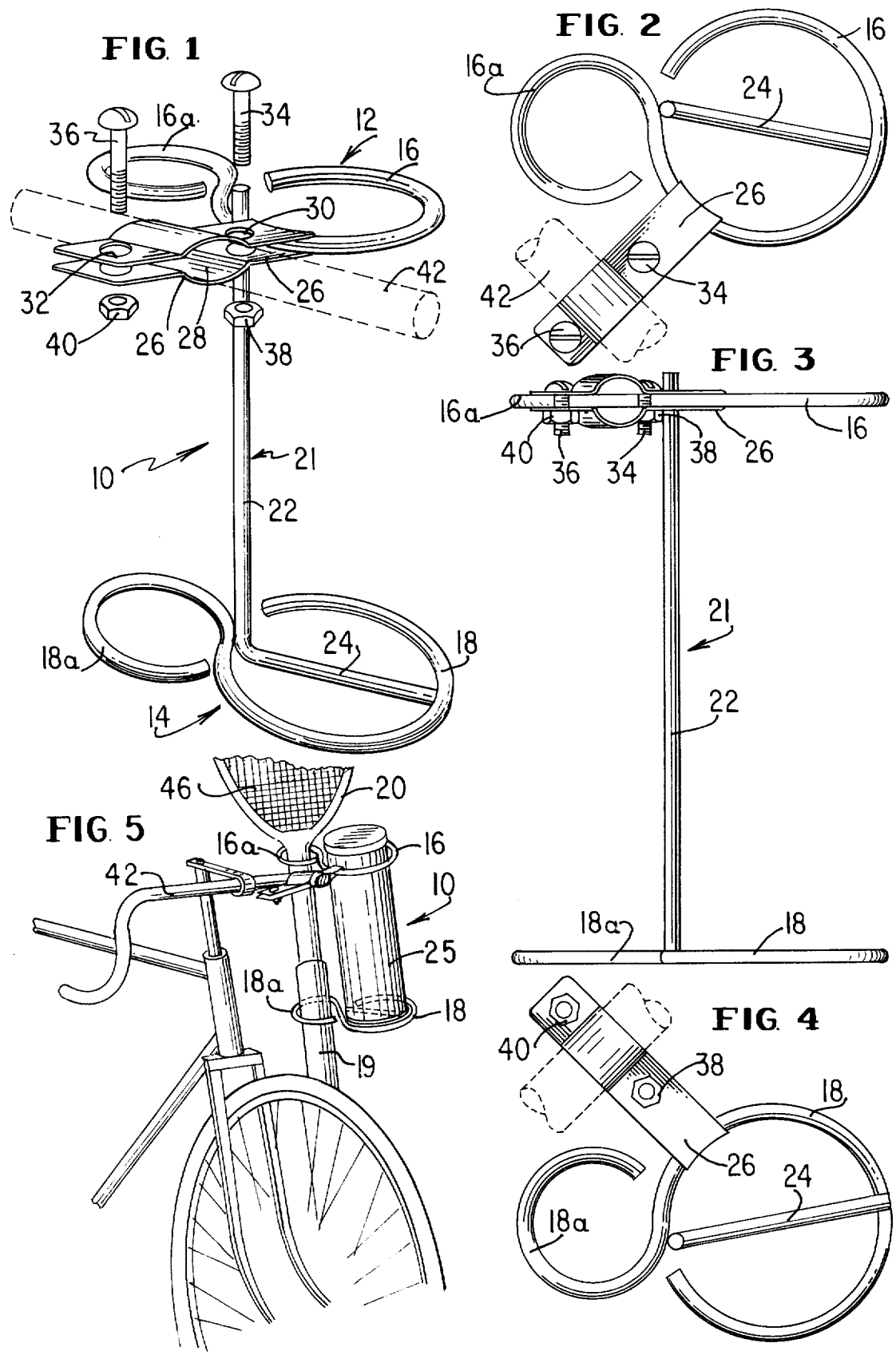

BALL AND RACKET CARRIER

BACKGROUND OF THE INVENTION

This invention relates to a new and useful device for carrying a tennis racket with a can of tennis balls, and in particular, it relates to a device suitable for carrying a tennis or racquet ball racket and a can or tube of balls on a bicycle.

Tennis is one of the more popular sports in the country today, if not the world. Tennis clubs, both indoor and outdoor, have sprung up not only in the suburbs, but in the cities. With the growth of this sport and the trend of the average person to obtain as much exercise as possible, people have been pedaling their way to the tennis courts. In most areas of the city and suburbs today, there is an outdoor and/or indoor tennis court available within blocks. However, it is very awkward to carry a tennis racket and a can of balls while riding a bicycle; if not just plain dangerous. Also, more and more people are using their bikes to go to the tennis court in lieu of driving because of the high cost of gas and to conserve fuel. Various types of contraptions are devised by the tennis-cyclist for strapping or otherwise attaching the racket and can of balls either to himself or to the bike. Some of the devices conceived and used by the tennis-cyclist are not only dangerous but awkward and cumbersome.

There has developed a need for a device, attached to a bicycle, that is safe and easy to use for carrying a racket and a can of balls. To the best of my knowledge, I have not seen nor am I aware of any device for carrying a racket and a can of balls that is easily attached to a bicycle.

My invention is for a device, attached to a bicycle for carrying a tennis or racquet ball racket and a can or tube of balls. The device comprises a pair of rods, each of the rods being shaped into a figure 8 configuration and coupled together by an L shaped rod. The device is attached to the bicycle by means of a coupling or linking element. My invention is attached to and positioned on the bicycle so that it will not interfere with the cyclist.

SUMMARY OF INVENTION

The present invention relates to an aesthetic device for carrying a tennis or racquet ball racket and a can or tube of balls that is attachable to a bicycle. The device comprises a pair of rods each of which are shaped into a figure 8 configuration, one of the two circular sections of the 8 being somewhat larger than the other. The shaped rods are placed in a vertical relationship to one another and connected together by an L shaped rod; the horizontal part of the L shaped rod bisecting or otherwise cutting across the larger circular section of the lower shaped rod. The bisecting of the larger circular section of the lower shaped rod enables a can or tube of balls to rest thereon. The smaller circular sections of the shaped rods enable the handle of the racket to fit therein; the head of the racket, being larger than the handles, will rest upon the upper shaped rod.

A connecting linkage couples the device to the bicycle in such a manner that the cyclist is free to pedal without the worry of dropping the racket or tennis balls.

The principal object of the invention is to provide a device for carrying a tennis racket and can or tube of balls.

It is a further object of this invention to provide a device for carrying a tennis racket and can or tube of balls that is easily attached to a bicycle.

A further object of this invention is to provide an aesthetic device that is inexpensive and is easily attached to a bicycle for carrying a racket and a can or tube of balls.

Still a further object of my invention is to provide an inexpensive, aesthetic device suitable for carrying a racquet ball racket and tube of balls that is easily attached to a bicycle.

IN THE DRAWINGS

FIG. 1 illustrates, in a perspective view, the device embodied by this invention.

FIG. 2 illustrates a top plan view of the device embodied by this invention.

FIG. 3 is a side elevational view of the device embodied by this invention.

FIG. 4 is a bottom plan view of the device embodied by this invention.

FIG. 5 is a cutaway perspective view of the device embodied by this invention attached to a bicycle.

DESCRIPTION OF PREFERRED EMBODIMENT

FIGS. 1 through 5 illustrate the device 10 embodied by this invention. The device 10 is comprised of a pair of rods 12 and 14, each of said rods having a figure 8 configuration. Each of the shaped rods 12 and 14 have a pair of circular sections 16, 16a and 18, 18a respectively. The circular sections 16 and 18 have the same diameter and the circular sections 16a and 18a are of the same diameter; the diameter of the circular section 16a, 18a being smaller than the diameter of the circular section 16, 18. The diameter of the circular portions 16a and 18a is large enough to have pass therethrough a handle 19 of a tennis or racquet ball racket 20. The width or circumference of a tennis or racquet ball handle varies depending upon the particular manufacturer of the racket. However, a diameter of approximately 2 inches for the circular sections 16a and 18a will accommodate the handles of most, if not all, tennis and racquet ball rackets made today. The diameter of the circular portions 16a, 18a is large enough to have pass therethrough a can or tube of balls commonly used for tennis or racquet ball. An inner diameter of approximately 3 inches is sufficient to enable the passage therethrough of a can or tube of tennis or racquet ball balls.

The rods 12 and 14 are of a material or composition suitable for forming into the figure 8 configuration. I have found that a ¼ cadmium finished steel rod is strong and suitable for easily obtaining the desired configuration. It is understood that the figure 8 configuration of rods 12 and 14 may be of plastic as well as other types and kinds of material without departing from the spirit and scope of the invention.

An L shaped rod 21 connects the rods 12 and 14 in a position such that the circular portions 16, 18 and 16a, 18a are respectively coaxial. The L shaped rod 21 has a vertical arm 22 and a horizontal arm 24; said horizontal section 24 bisecting the circular portion 18 of the rod 14. The horizontal section 24 of the L shaped rod 21 is positioned slightly below the circular section 18 enabling a can or tube of balls 25 to rest thereupon without passing through the opening; the circular section 18 forming a ridge to prevent the can or tube from slipping out. It is not necessary that horizontal section 24 bisect the circular section 18, but it must be positioned to inhibit a can or tube of balls to pass through said circular section. The L shaped rod 21 is attached to the rods 12 and 14 by welding means or other means well known in the art; said attachment of the rod being at a position where the circular portions 16, 16a of rod 12 join and where circular portions 18, 18a of rod 14 join. When the L shaped rod 21 is attached to the shaped rods 12 and 14, shaped rod 14 becomes the bottom of the device 10 while shaped rod 12 becomes the top end of said device.

A connecting linkage 26 is coupled to the circular portion 16 of rod 12. The linkage 26 is made of a spring type or other suitable metal or material and has a semi-circular shaped section 28 positioned at or near the center of said linkage. The linkage has a pair of apertures 30, 32 suitable for receiving bolts 34 and 36 respectively. A pair of nuts 38 and 40 are respectively positioned on bolts 34 and 36. The semi-circular section 28 of the linkage 26 is such that it snuggly fits across a bicycle handlebar 42 of a bicycle. The bolt 34 and its associated nut 38 secure the linkage 26 to the circular section 16 of shaped rod 12. Other means well known in the art can be used to secure the linkage 26 to the rod 12 other than the bolt 34 and nut 38 illustrated in the drawings. The bolt 36 and nut 40 secure the linkage 26 and hence the device 10 to the handle bars 42 of the bicycle. The device 10 is positioned on the handle bars so as not to encumber the cyclist.

It is understood that there are many types of connecting linkage well known in the art that can be used in lieu of the one illustrated in the drawings for connecting the device 10 to the bicycle without departing from the spirit and scope of this invention. It is understood that the linking member 26 may be connected to other parts of the device 10 as well as to parts other than the handle bars of the bicycle without departing from the spirit and scope of this invention.

As stated hereinabove, the device 10 is attached to the handle bars 42 of the bicycle in a position not to interfere with the cyclist. The handle 19 of the tennis racket 20 is positioned through the circular sections 16a and 18a; a head 46 of the racket 20 rests upon the circular section 16 thereby inhibiting the racket 19 from passing through the circular sections 16a, 18a. The can or tube of balls 25 is positioned within circular sections 16 and 18; said can resting upon horizontal member 24 of the rod 21. The circular sections 16 and 18 retain the can or tube of balls 25 within the device 10.

The length of the vertical arm 22 should be such as to enable the passage of racket handle 19 through both circular sections 16a, 18a respectively. The length of the racket handle 19 for a tennis racket is longer than that for a racquet ball racket. Therefore, if the device is to be compatible for use with both tennis and racquet ball rackets the length of the vertical arm 22 of the L shaped rod 21 should be such as to enable the racquet ball racket handle to pass through circular sections 16a and 18a.

It is further understood that the sections 16, 16a of rod 12 and 18, 18a of rod 14 may be of a geometric configuration other than circular without departing from the spirit and scope of the invention. For example, it is possible that the balls may be packaged in a container having a rectalinear or other geometric configuration. If the balls are packaged in a container, having a geometric configuration other than circular, as shown in the drawings, then sections 16 and 18 or rods 12 and 14 respectively would be shaped to have the same geometric configuration as the container.

It is also understood that the rod 21 connecting the rods 12 and 14 may have a configuration other than being L shaped. The connecting rod 21 may be straight.

It is believed that the invention has been described in such detail as to enable those skilled in the art to understand the same, and it will be appreciated that variations or modifications may be made without departing from the spirit and scope of the invention.

What is desired to secure by letters patent in the United States is:

1. A device for carrying a tennis or racquet ball racket and a container of balls on a bicycle, said device comprising:
    an upper continuous rod formed into a figure eight configuration having a pair of circular sections one larger than the other;
    a lower continuous rod formed into a figure eight configuration having a pair of circular sections one larger than the other, said upper and lower circular sections being equal in size and positioned such that the respective sections are coaxial with each other whereby, the larger coaxially aligned circular sections are adapted to receive the can of balls while the other circular sections are adapted to receive the handle of the racket;
    a connecting rod having one end attached to the upper rod and the other end attached to the lower rod, said connecting rod having an element thereof positioned across the larger circular section of the lower rod, wherein said connecting rod element inhibits the can of balls from passing through the larger circular sections of the upper and lower rods and the smaller circular sections inhibit the racket from passing therethrough; and
    means for coupling the device to the bicycle.

2. A device for carrying a tennis or racquet ball racket and a container of balls on a bicycle as defined in claim 1, said means for coupling the device to the bicycle comprises:
    a linkage having means for being attached to the device and to the bicycle.

3. A device for carrying a tennis or racquet ball racket and a container of balls on a bicycle as defined in claim 2 wherein said means for attaching the linkage to the device and the bicycle comprises:
    a plurality of bolts, each passing through an aperture, wherein a pair of apertures are positioned to enable a handlebar of a bicycle to pass therebetween and a second pair of apertures positioned to enable a section of the upper rod to pass therebetween; and
    a nut, positioned on each bolt after it is positioned in said aperture, securing said linkage to the device and to the bicycle.

* * * * *